Sept. 8, 1936.  H. R. PRESCOTT  2,053,841
METHOD AND APPARATUS FOR MAKING GEOPHYSICAL EXPLORATIONS
Filed Aug. 5, 1935
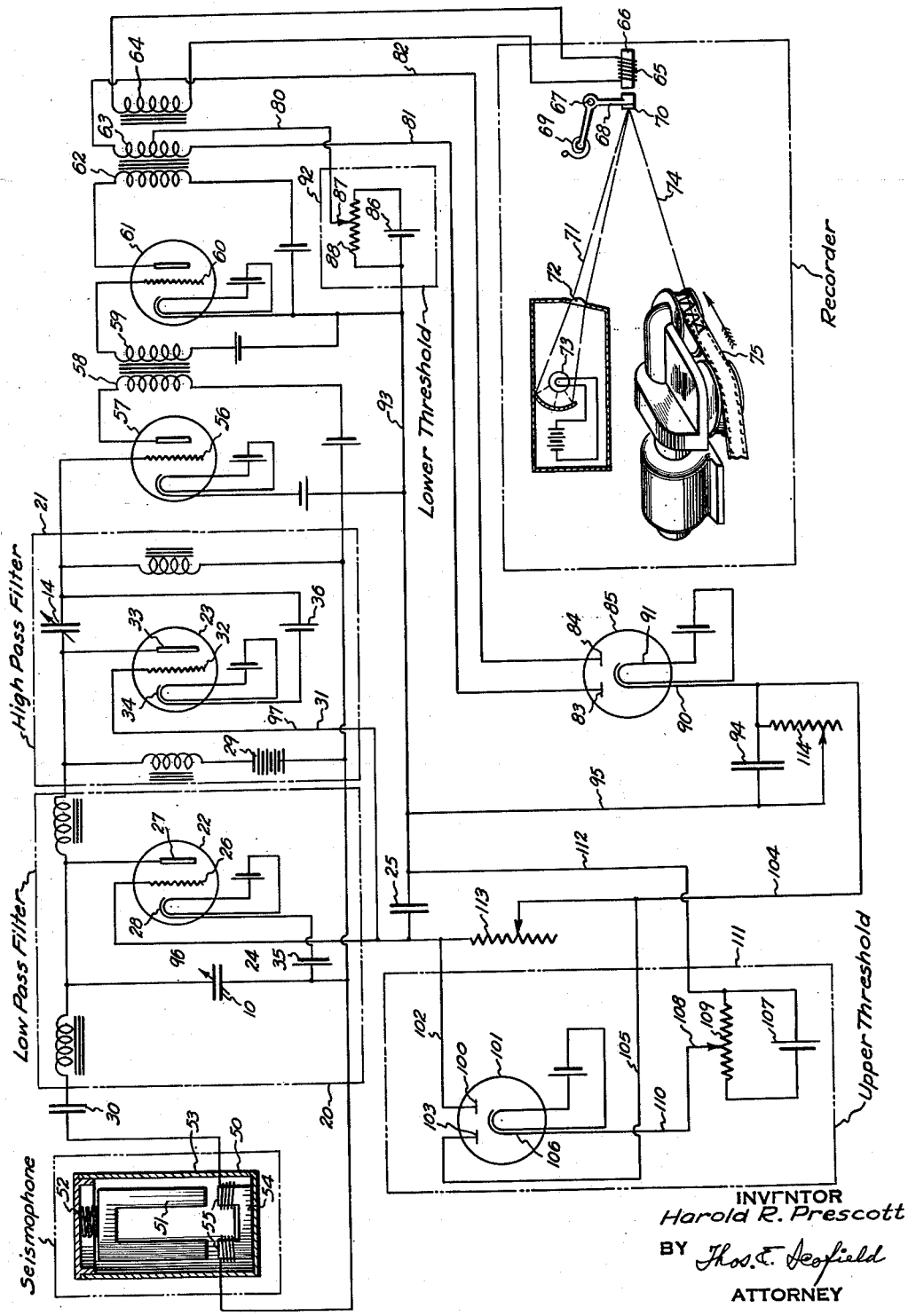
INVENTOR
Harold R. Prescott
BY Thos. E. Scofield
ATTORNEY Patented Sept. 8, 1936

2,053,841

UNITED STATES PATENT OFFICE 2,053,841

METHOD AND APPARATUS FOR MAKING GEOPHYSICAL EXPLORATIONS

Harold R. Prescott, Ponca City, Okla., assignor to Continental Oil Company, Ponca City, Okla., a corporation of Delaware Application August 5, 1935, Serial No. 34,770

7 Claims. (Cl. 181—0.5)

My invention relates to a method and apparatus for making geophysical explorations, and more particularly to a method of making geophysical explorations by means of seismic waves of selected frequencies.

In copending application, Serial No. 709,899, filed February 5, 1934, in which Frank L. Searcy and myself were joint inventors, we show a means and method of making geological explorations, in which substantially only desirable frequency vibrations of those transmitted from underlying geological strata are recorded. The means there shown is a manually adjustable device. In actual use, it is frequently desirable to adjust the high pass filter at a different place for reflections from shallow geological beds than those from deep lying geological strata. In some areas, when very shallow strata are investigated, as well as intermediate and very deep strata, it is frequently desirable to use as many as three different determinations using the three different adjustments of a high pass filter.

There are areas in which explorations are made where there are geological strata lying as close to the surface as 500 feet, while in the same areas, strata exist at depths as great as 25,000 or 30,000 feet. I have found, by examining a large number of records taken in the field, that for shallow geological beds, the frequency of the reflected waves, that is, the influenced elastic waves returning to the surface, is normally between 50 and 80 vibrations per second. For the intermediate geological beds, the frequency of the reflected seismic waves is normally between 35 and 50 cycles per second, while for very deep geological beds, the frequency of the reflected seismic waves will normally lie between 20 and 35 cycles per second.

In order to secure the reflected seismic waves from the shallow geological strata with maximum clarity, the entire recording system should be fully responsive to frequencies from 50 to 80 vibrations per second, and frequencies lower and higher than this range should be rejected.

In order to secure the reflected seismic waves from the intermediate geological strata with maximum clarity, the entire recording system should be fully responsive to frequencies from 35 to 50 vibrations per second and those above and below this frequency should be rejected.

To the end that the reflected seismic waves from the deep lying geological strata be received with maximum clarity, the entire recording system should be fully responsive to frequencies from 25 to 35 vibrations per second and those vibrations above and below this range should be rejected.

Using the means and method shown in prior application, Serial No. 709,899, it will be necessary to take three shots using three separate adjustments of the high pass and low pass filters. The method of proceeding with a "shot" is well known to those skilled in the art. Vibrations are generated by detonating a charge of explosives at or near the surface of the earth. The seismic waves generated travel in all directions, those reaching geological strata being reflected toward the surface of the earth where they are received by means of seismophones.

One object of my invention is to provide a means and method of making geophysical explorations in which both high and low pass filters are automatically adjusted to the end that seismic waves from geological beds at different depths are received at maximum clarity.

One disadvantage of the means and method shown in prior application Serial No. 709,899 occurs when reflected waves from shallow beds are received. In order to receive these shallow reflected seismic waves, the recording system is made responsive to frequencies from 50 to 80 cycles per second, so that those higher or lower are rejected. This gives a clear record for the reflected seismic waves from the shallow beds, but the direct wave coming through the near surface layer, will be reproduced very poorly since the direct wave impact is normally of a lower frequency than the reflected seismic waves from the shallow beds. This direct wave is of importance for computing the thickness of the weathered layer and, accordingly, should be reproduced at the full amplitude. In order to reproduce the wave at full amplitude the filter adjustment must be such that frequencies of about 25 cycles per second be admitted.

It is another object of my invention to provide a means and method of making seismic geophysical explorations which will permit the direct wave to be admitted, while automatically filtering the reflected seismic waves from shallow geological strata to admit frequencies lying between 50 to 80 vibrations per second while rejecting lower frequencies.

In general, my invention contemplates the provision of an upper threshold circuit network and a lower threshold circuit network controlling the charging of a condenser by the output of the amplification channel and employing the floating charge, which will be proportional to the amplitude of the reflected seismic waves, to control the high pass and low pass filters.

The figure is a diagrammatic view showing one embodiment of apparatus according to my invention, capable of carrying out the process of my invention.

Referring now to the figure, and considering condenser 10 of the low pass filter, if a high resistance were placed across the condenser, the change in impedance and change in capacity reactance of the combination would not be appreciably varied if the resistance were sufficiently high. As the resistance is lowered, the effective value of the capacity reactance of the combination becomes less and this has the effect in the low pass filter 20 of reducing the value of capacity 10.

Considering now the capacity 14 of the high pass filter 21, if a high resistance were placed across this capacity, the change in impedance and change in capacity reactance of the combination would not be appreciably varied, if the resistance were sufficiently high. As the resistance is lowered, the effective value of the capacity reactance of the combination becomes less and this has the effect, in the high pass filter, of reducing the value of capacity 14.

If the initial value of capacities 10 and 14 were set to admit frequencies from 20 to 35 vibrations per second and a resistance of suitable value were placed across each capacity, the frequencies which would then be admitted could be increased by adjusting the values of the resistances so that the system could be made responsive, for example to frequencies from 50 to 80 vibrations per second.

If, instead of a simple resistance, a governing device were placed across capacity 10 and a suitable governing device were placed across capacity 14, we would have a system in which the frequencies admitted were governed.

For the purpose of governing the frequencies admitted by the filters, I employ thermionic tubes 22 and 23. It is a property of a thermionic tube that the resistance in the plate circuit is a function of the potential upon the grid. The arrangement is such that the governing charge which might be acquired by condenser 25 is impressed upon the grid 26 of tube 22 by conductor 24 and upon the grid 32 of tube 23 by conductor 31. In the indirectly heated cathode tubes shown, when the grid becomes positive, the resistances from plate 27 to cathode 28 of tube 22 and the resistance from plate 33 to cathode 34 of tube 23 become lower. The amount of positive governing charge upon the grid determines the decrease in resistance. Battery 29 places positive potential upon plates 27 and 33. This initial potential lifts the plate potential so that the resistance of tube 22 is not influenced by minor voltages such as are given out by the seismophone. It will be seen, therefore, that the resistance of the tube is a function of the governing charge upon the grid. Condenser 30 protects the seismophone network from the battery. Battery 35 places a bias upon cathode 28 of tube 22 and determines the initial resistance of this tube, while battery 36 biases the cathode 34 of tube 23 and determines the initial resistance of this tube. If desired, adjustable means may be provided to control the amount of potential delivered from batteries 35 and 36 as cathode bias.

The seismophone 50 may be of any suitable type. In the form shown, a magnet 51 is suspended by means of a spring 52 in a frame 53. Secured to the frame is an armature 54. The seismophone upon receiving earth vibrations, will move. Due to its weight, the magnet 51 will tend to remain stationary in space while armature 54 having windings 55 will move relative to the magnet, thus changing the path of magnetic flux of the magnet and cutting lines of force in coils 55, thus inducing electromotive forces in sympathy with the vibrations received. The electromotive forces will be filtered by low pass and high pass filters 20 and 21 and be impressed upon the grid 56 of the first tube 57 of the amplification channel. Plate current will flow through the primary 58 of a transformer of varying intensity in sympathy with the electromotive forces impressed upon the grid 56. The voltages of varying potential will be picked up by the secondary 59 of the transformer and impressed upon the grid 60 of the second tube 61 of the amplification channel. It is understood, of course, that any desired number of amplification tubes may be employed. The plate current in the final tube of the amplification channel will flow through the primary 62 of a transformer in sympathy with the vibrations inducing electromotive forces in coil 63 which is inductively coupled therewith. Also inductively coupled with coil 62 is coil 64, the output of which is passed through coil 65 which is wound around armature 66. Pivoted adjacent armature 66 on pivot 67 is a bell crank lever 68, one end of which is admitted by hair spring 69 and the other end of which carries a mirror 70 upon which a beam of light 71 is focused by lens 72 from light source 73. The reflected beam of light 74 is impressed upon photosensitive strip 75 which is passed rapidly by the beam of light by suitable driving mechanism. As the current passing through coil 65 varies in intensity in sympathy with the vibrations received, the lever 68 will be attracted more or less strongly, moving the beam 74 in accordance with the vibrations received.

Coil 63 is center tapped by conductor 80. The terminals of coil 63 are connected by conductors 81 and 82 to elements 83 and 84 of the duodiode tube 85. Conductor 80 is biased by means of battery 86, the position of arm 87 upon resistance 88 determining the amount of bias. It will be observed that, until the potential is such as to overcome the bias imposed by battery 86, that no current will flow through the duodiode tube 85.

It will be observed that, in the arrangement shown, when either conductor 81 or conductor 82 becomes positive with respect to conductor 80, the tube 85 serves as a rectifier to pass current to its cathode 90. The cathode 90 of tube 85 being heated by filament 91 will emit electrons. Let us assume that the condition is such that element 84 of the duodiode tube 85 is positive. Electrons will flow from the cathode 90, which is a source of electrons due to its being heated, to element 84, thence through conductor 82, through a portion of coil 63, through conductor 80, to the lower threshold network 92. Let us assume that the voltage is sufficient to overcome the bias of the lower threshold. The negative electrons will continue through conductor 93 and charge one plate of condenser 25 with negative charges. Similarly, one side of condenser 94 will accumulate a negative charge through conductor 95. The other plate of condenser 25 will be positive with respect to the plate upon which the electrons accumulate. The charges accumulating upon condensers 25 and 94 are impressed upon grids 26 and 32, through conductors 96 and 97, thus biasing the grids to induce a greater current flow, which has the effect of lowering the resistance of tubes 22 and 23 as pointed out hereinabove.

Prior to the arrival of the direct wave, the resistance of tubes 22 and 23 is very high because no governing charge exists upon condensers 25 and 94. If condensers 10 and 14 have been set to admit the frequency band of 25 to 35 cycles, the direct wave will be admitted in an excellent manner due to the low frequency setting of the filters. The voltage induced in coil 63 by the arrival of the direct wave will charge condensers 25 and 94, thus lowering the resistance of tubes 22 and 23, causing the low pass filter 20 and the high pass filter 21 to admit a higher frequency band.

It will be observed that the positive side of condenser 25 is connected to element 100 of duodiode tube 101 by conductor 102 and that the positive side of condenser 94 is conneced to element 103 of the duodiode tube 101 by conductors 104 and 105. The cathode 106 of the duodiode tube 101 is biased by battery 107, acting through arm 108 and resistance 109. The amount of bias is determined by the position of arm 108 upon resistance 109 and is communicated to the cathode 106 through conductor 110. The upper threshold network 111 communicates with the negative side of condensers 25 and 94 through conductor 112. It will be observed that the range is such that the condensers are short circuited through a duodiode valve 101. When the positive charge of condensers 25 and 94 accumulates sufficient potential to overcome the bias imposed by battery 107, current will flow from either element 103 or element 100 to the cathode 106, thus permitting the excess potential to discharge. It will be observed that the upper threshold 111 governs the charges upon condensers 25 and 94, beyond which they cannot go. It will also be observed that the lower threshold 92 prevents the charging of condensers 25 and 94 by voltages below a predetermined potential governed by the setting of arm 87 upon resistance 88.

By suitable adjustment of the upper theshold, the excess of the large floating charge of the direct wave over and above the value set and determined by the upper threshold is bypassed. The setting of arm 108 upon resistance 109 is such that the governing charge upon condensers 25 and 94 will be that which will be imposed by the reception of reflected seismic waves only. The arrangement is such that the charging of condensers 25 and 94 by the reception of reflected seismic waves will reduce the resistance of tubes 22 and 23 such that the filters will pass a wave band from 50 to 80 vibrations per second.

The amplifier system in the arrangement I have described will amplify the direct wave excellently. This wave will impose a floating charge upon condensers 25 and 94 such that the governing charge will alter the resistances of tubes 22 and 23 so that the reflection seismic waves from shallow geological strata will be excellently reproduced.

As the amplitudes of the reflected seismic waves become less, the arrivals are coming from deeper geological horizons. The governing charge will also become less. It will be observed that the charge on condenser 25 may leak off through resistances 113 and 114 and that the charge upon condenser 94 may leak off through resistance 114. These resistances, of course, are high so that there is a time lag during which the condensers 25 and 94 retain their respective charges. However, as the amplitudes of the waves become less and less, floating charges upon condensers 25 and 94 will become less and less. Lower floating charges cause the resistances of tubes 22 and 23 to become higher and the frequencies which the filter system admits will become lower. The potential of the governing charge is represented as a function of the amplitudes of the vibrations received. The rate of decay of amplitudes is represented in the rate of decay of the governing charge and is correspondingly represented in a lower frequency band that the filters 20 and 21 will admit.

When the amplitudes become so small that the potentials produced are insufficient to overcome the resistance of the lower threshold, no governing charge will exist upon condensers 25 and 94, thus permitting the filters to admit the lowest frequency band as determined by the manual adjustment of capacities 10 and 14.

By the use of an arrangement of my invention, a single shot will reproduce with clarity the entire record, including the first true beginning of the direct wave, the first reflected seismic waves from shallow geological beds, the intermediate reflected seismic waves from deeper geological beds, and the latest reflected seismic waves from the deepest geological horizons. Employing my method, it is possible to obtain usable records which can be analyzed, of all geological strata with a single shot.

It will be observed that I have accomplished the objects of my invention. I have provided a means and method of making geological explorations in which maximum clarity is obtained by a filtering arrangement which is automatically adjusted to admit the desirable frequencies as they are reflected from various geological layers.

It will be understood that certain features and sub-combinations are of utility and may be employed without reference to other features and sub-combinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A method of making geophysical explorations including the steps of creating elastic waves at or near the earth's surface, converting said waves and reflections thereof from geological strata into varying electromotive forces in sympathy with said waves, selecting electromotive forces of a desired frequency range and varying said selecting step as a function of the potential of the electromotive forces selected and recording the voltage variations in the selected electromotive forces.

2. In a method of making geophysical explorations in which elastic waves are created at or near the earth's surface, said waves and reflections thereof are received at or near the earth's surface after they have traveled through the earth, said received waves are converted into electric currents substantially in sympathy with said waves, the steps of rejecting undesirable low frequency currents, controlling said rejecting step in response to the amperage of the desirable frequency currents selected, and recording the resulting current fluctuations.

3. In a method of making geophysical explorations in which elastic waves are created at or near the earth's surface, said waves and reflections thereof are received at or near the earth's surface after they have traveled through the earth, said received waves are converted into electric currents substantially in sympathy with said waves, the steps of rejecting undesirable low frequency currents, rejecting undesirable high frequency currents, controlling said rejecting steps in response to the amperage of desirable intermediate frequency currents selected, and recording the resultant current fluctuations.

4. In an apparatus for making geophysical explorations, a seismophone for converting earth vibrations into electromotive forces of varying potential in sympathy with earth vibrations, means for impressing the output of said seismophone upon a band pass filter, means for impressing the output of said band pass filter upon an amplification channel, means responsive to the output of said amplification channel for controlling said band pass filter, and means for recording the output of said amplification channel.

5. In an apparatus for making geophysical explorations, a seismophone for converting earth vibrations into electromotive forces of varying potential in sympathy with earth vibrations, means for impressing the output of said seismophone upon a band pass filter, means for impressing the output of said band pass filter upon an amplification channel, means responsive to the output of said amplification channel for controlling said filter, and means for preventing said controlling means from operating below a predetermined output of said amplification channel, and means for recording the output of said amplification channel.

6. In an apparatus for making geophysical explorations, a seismophone for converting earth vibrations into electromotive forces of varying potential in sympathy with earth vibrations, means for impressing the output of said seismophone upon a band pass filter, means for impressing the output of said band pass filter upon an amplification channel, means responsive to the output of said amplification channel for controlling said filter, means for limiting the controlling action of said control means at a predetermined point, and means for recording the output of said amplification channel.

7. In an apparatus for making geophysical explorations, a seismophone for converting earth vibrations into electromotive forces of varying potential in sympathy with earth vibrations, means for impressing the output of said seismophone upon a band pass filter, means for impressing the output of said band pass filter upon an amplification channel, means responsive to the output of said amplification channel for controlling said filter, means for preventing said controlling means from operating below a predetermined output of said amplification channel, means for limiting the controlling action of said control means at a predetermined point, and means for recording the output of said amplification channel.

HAROLD R. PRESCOTT.